(12) United States Patent
Apte (10) Patent No.: US 9,317,327 B2
(45) Date of Patent: Apr. 19, 2016

(54) COMPUTING INFRASTRUCTURE PLANNING

(71) Applicant: BMC Software, Inc., Houston, TX (US)

(72) Inventor: Sudheer Apte, Walpole, MA (US)

(73) Assignee: BMC Software, Inc., Houston, TX (US)

( * ) Notice: Subject to any disclaimer, the term of this patent is extended or adjusted under 35 U.S.C. 154(b) by 480 days.

(21) Appl. No.: 13/780,548

(22) Filed: Feb. 28, 2013

(65) Prior Publication Data

US 2014/0244230 A1    Aug. 28, 2014

(51) Int. Cl.
G06F 17/50    (2006.01)
G06F 9/50    (2006.01)

(52) U.S. Cl.
CPC ......................................... *G06F 9/50* (2013.01)

(58) Field of Classification Search
CPC ........................................................ G06F 9/50
USPC ............................................................ 703/13
See application file for complete search history.

(56) References Cited

PUBLICATIONS

BMC BladeLogic Server Automation User Guide; BMC Software user guide; Feb. 2011; 1374 pages.*
Muddana: BladeLogic Grammar User's Guide for Configuration Files and Extended Objects; BMC Software user guide; 2005; 9 pages.*
BMC BladeLogic Automation Suite; BMC product brochure; Apr. 2011; 4 pages.*

* cited by examiner

*Primary Examiner* — Hugh Jones
(74) *Attorney, Agent, or Firm* — Brake Hughes Bellermann LLP (57) ABSTRACT

In accordance with aspects of the disclosure, systems and methods are provided for generating one or more potential configurations corresponding to one or more parameters used for computing infrastructure planning by determining a sizing grammar for each of the one or more potential configurations corresponding to the one or more parameters, interpreting the sizing grammar based on one or more grammar rules to output configuration information for each of the one or more potential configurations, and translating the configuration information for each of the one or more potential configurations based on one or more motif descriptions to output resource information for each of the one or more potential configurations.

17 Claims, 7 Drawing Sheets

COMPUTING INFRASTRUCTURE PLANNING

TECHNICAL FIELD

The present description relates to computing infrastructure planning.

BACKGROUND

In resource management, information technology (IT) managers typically decide how much computing, storage, and network capacity will be needed to support anticipated business workloads, while being mindful of configuration costs. Capacity planning allows the IT manager to estimate these parameters. For a given configuration of computing, storage, and network infrastructure, the IT manager may manually specify anticipated workloads to decide expected utilization of a given infrastructure. However, this procedure is inefficient, time-consuming, and repetitive. Based on estimated results for each configuration, the IT manager may need to manually select and specify another configuration and estimate expected utilization again. As such, the burden is on the IT manager to manually specify a detailed hypothetical infrastructure configuration for each expected utilization. Therefore, there exists a need to improve computing infrastructure estimation techniques and reduce manually specifying hypothetical configurations.

SUMMARY

In accordance with aspects of the disclosure, a computer system may be provided for computing infrastructure planning including instructions stored on a non-transitory computer-readable medium and executable by at least one processor. The system may include a configuration generator configured to cause the at least one processor to generate one or more potential configurations corresponding to one or more parameters utilized for computing infrastructure planning. The configuration generator may include a grammar interpreter configured to determine a sizing grammar for each of the one or more potential configurations corresponding to the one or more parameters and interpret the sizing grammar based on one or more grammar rules to output configuration information for each of the one or more potential configurations. The configuration generator may include a motif expander configured to translate the configuration information for each of the one or more potential configurations based on one or more motif descriptions to output resource information for each of the one or more potential configurations corresponding to the one or more parameters.

In accordance with aspects of the disclosure, a computer-implemented method may be provided for computing infrastructure planning. In an implementation, the method may include generating one or more potential configurations corresponding to one or more parameters utilized for computing infrastructure planning by determining a sizing grammar for each of the one or more potential configurations corresponding to the one or more parameters, interpreting the sizing grammar based on one or more grammar rules to output configuration information for each of the one or more potential configurations, and translating the configuration information for each of the one or more potential configurations based on one or more motif descriptions to output resource information for each of the one or more potential configurations corresponding to the one or more parameters.

In accordance with aspects of the disclosure, a computer program product may be provided, wherein the computer program product is tangibly embodied on a computer-readable storage medium and includes instructions that, when executed by at least one processor, may be configured to generate one or more potential configurations corresponding to one or more parameters utilized for computing infrastructure planning by determining a sizing grammar for each of the one or more potential configurations corresponding to the one or more parameters, interpreting the sizing grammar based on one or more grammar rules to output configuration information for each of the one or more potential configurations, and translating the configuration information for each of the one or more potential configurations based on one or more motif descriptions to output resource information for each of the one or more potential configurations corresponding to the one or more parameters.

The details of one or more implementations are set forth in the accompanying drawings and the description below. Other features will be apparent from the description and drawings, and from the claims.

DETAILED DESCRIPTION

In various implementations, aspects of the disclosure provide a system and methods for computing infrastructure planning. The computing infrastructure planning may describe capacity planning for computing infrastructure including one or more of computing capacity planning, storage capacity planning, and network capacity planning while maintaining a threshold for cost. In an example, the system and methods described herein provide for efficient capacity planning by enabling a capacity planning mechanism to automatically generate many possible and potential infrastructure configurations. For each such generated configuration, the capacity planning mechanism may be configured to use various algorithms to simulate utilization. The manner in which to generate these configurations is addressed by the system and methods described herein.

Figure 1:
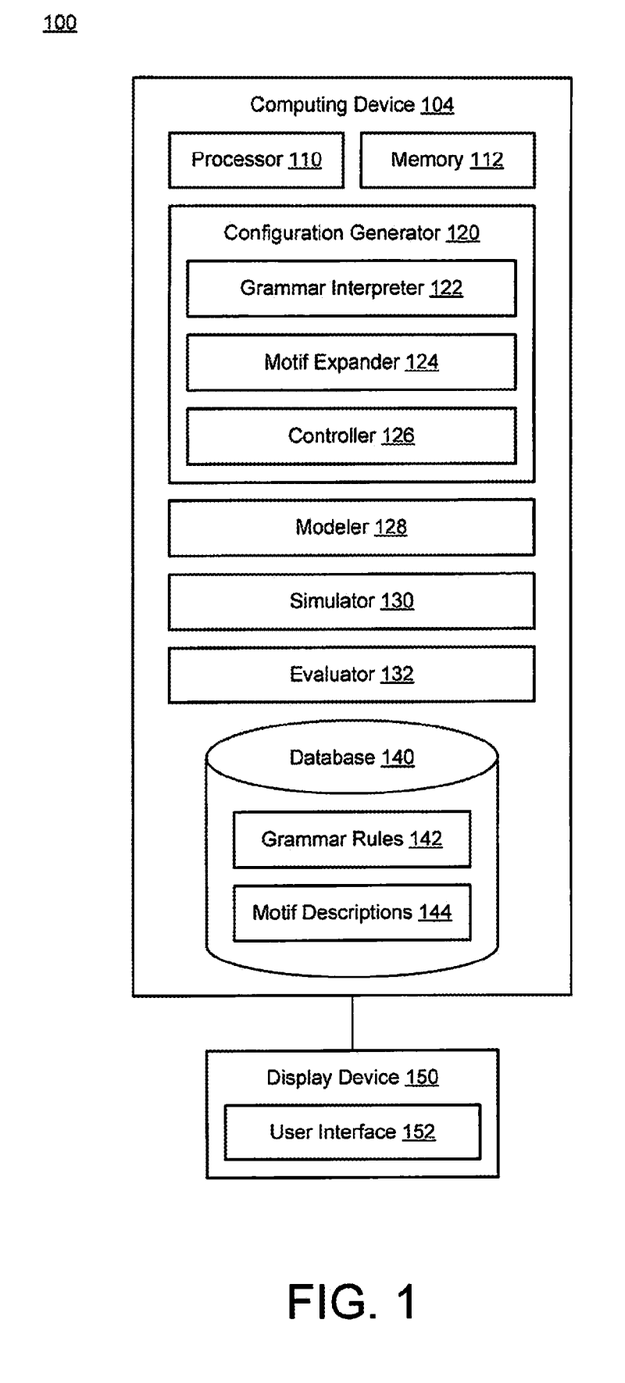
FIG. 1 is a block diagram illustrating an example system for computing infrastructure planning, in accordance with aspects of the disclosure.

FIG. 1 is a block diagram illustrating an example system 100 for computing infrastructure planning, in accordance with aspects of the disclosure. In the example of FIG. 1, the system 100 comprises a computer system for implementing a system for computing infrastructure planning that may be associated with a computing device 104, thereby transforming the computing device 104 into a special purpose machine designed to implement computing infrastructure planning process(es) and techniques, as described herein. In this sense, the computing device 104 may include any standard element(s) and/or component(s), including at least one processor(s) 110, memory 112 (e.g., non-transitory computer-readable storage medium), one or more optional database(s) 140, power, peripherals, and various other computing element(s) and/or component(s) that may not be specifically shown in FIG. 1. Further, the system 100 may be associated with a display device 150, such as, for example, a monitor or other display) that may be used to provide a user interface (UI) 152, such as a graphical user interface (GUI). In an implementation, the UI 152 may be used to receive preferences, parameters, and/or various input information from a user for implementing and/or using the system 100. As such, various other element(s) and/or component(s) of the system 100 that may be useful to implement and/or use the system 100 may be added, inserted, or included, as would be apparent to one of ordinary skill in the art.

Accordingly, the computing infrastructure planning system 100 of FIG. 1 may include the computing device 104 and instructions recorded on the memory 112 (e.g., non-transitory computer-readable medium) and executable by the at least one processor 110. Further, the computing infrastructure planning system 100 may include the display device 150 for providing output to a user, and the display device 150 may include the user interface (UI) 152 for receiving input from the user.

In the example of FIG. 1, the system 100 may include a configuration generator 120 configured to cause the at least one processor 110 to generate one or more potential configurations corresponding to one or more parameters utilized for computing infrastructure planning. The configuration generator 120 may include one or more of a grammar interpreter 122, a motif expander 124, and a controller 126.

As described herein, the computing infrastructure planning may refer to capacity planning for computing infrastructure including computing capacity planning, storage capacity planning, and/or network capacity planning while considering a cost threshold for the one or more potential configurations. The computing infrastructure may refer to various hardware and/or software used to interconnect computers and users.

In an implementation, the computing infrastructure may refer to various infrastructure platforms including a converged infrastructure platform (e.g., Vblock from the VCE company in Richardson, Tex.) that may be offered in several different model series (e.g., Vblock 300 series), wherein each model series enables various configurations for computing, networking, and storage capacity. The architecture of the model series may be constrained by a vendor to thereby limit a number of combinations that need to be tested and certified for use.

Accordingly, the system and methods provided herein may be configured to represent a model series of a converged infrastructure platform architecture so that one or more or all potential configurations may be automatically generated, and the generated configurations may be evaluated for cost and workload capacity. Therefore, aspects of the disclosure provide a representation referred to as a sizing grammar that captures the particular architecture of a model series for a converged infrastructure platform. In some implementations, the sizing grammar may be used to enable an automatic procedure to start from a base configuration and from it generate all possible configurations.

In various implementations, the one or more potential configurations may include one or more base configurations and/or one or more expanded configurations. In various examples, the one or more base configurations may describe one or more lower bounded configurations including, for example, one or more initial configurations for generating one or more expanded configurations based on each of the one or more base configurations. In various other examples, the one or more expanded configurations may describe one or more incremental bounded configurations including, for example, one or more upper bounded configurations.

In an implementation, the base configuration may describe one or more physical resource characteristics including capacity options for a starting quantity of computing devices, storage devices, and/or network devices. In another implementation, the base configuration may describe one or more physical resource characteristics including capacity growth options for adding a number of computing devices, storage devices, and/or network devices.

In an implementation, the one or more parameters may include at least one of computing capacity, storage capacity, workload capacity, and one or more constraints associated with each capacity including one or more of purchase constraint, power constraint, and cooling constraint.

For instance, in reference to computing capacity, one component type of computing infrastructure may include the use of one or more blade servers, which refers to a compact modular server computer configured to reduce the use of physical space and energy. In some examples, blade servers are designed to save space and reduce power consumption, while functioning as a computer. Another component type of computing infrastructure may include use of a blade enclosure configured to house and interconnect multiple blade servers and provide power, cooling, networking, storage, and various other component management services. In some examples, a blade system may refer to one or more blade enclosures with each equipped with one or more blade servers. The blade system may have a standard or base configuration, which describes a minimum possible size of equipment, and from the base configuration, the blade system may be expanded to include additional components to provide various expanded configurations.

In reference to storage capacity, a blade system may or may not use local memory for storage, and instead, the blade system may use various storage connection methods, such as, for example, FireWire (IEEE 1394 interface), SATA (Serial ATA), E-SATA (External SATA), SCSI (Small Computer System Interface), SAS (Serial Attached SCSI), DAS (Direct-attached storage), FC (Fibre Channel), and iSCSI (Internet SCSI). In various examples, one or more of these types of storage connection interfaces may be aggregated on a blade server chassis or through another blade server. Hence, designing blade systems may involve balancing the amount of memory a system needs with the type of storage for efficiency while minimizing the cost associated with storage for the desired blade system. Thus, with each equipment configuration, the performance-to-memory ratio should be addressed along with the associated cost to meet the storage requirements of the desired blade system.

In reference to cooling constraint, during operation of a blade system, computing infrastructure components produce heat that should be dissipated to ensure efficient operation. Although efficient, an increased density of blade configurations may result in higher demands for cooling. Some blade systems dissipate heat with air-cooling components, such as fans, and/or liquid-cooling components. Hence, designing and configuring blade systems may involve balancing the amount of heat a system generates and the ability to dissipate heat while minimizing the cost associated with cooling the desired blade system. Therefore, with each equipment configuration, the performance-to-cooling ratio should be addressed along with the associated cost to meet the cooling requirements of the desired blade system.

In the example of FIG. 1, the grammar interpreter 122 may be configured to determine (e.g., locate, identify, find, read, capture, use, utilize, etc.) a sizing grammar for each of the one or more potential configurations corresponding to the one or more parameters. In an implementation, the grammar interpreter 122 may be configured to interpret the sizing grammar based on one or more grammar rules 142 to output configuration information for each of the one or more potential configurations. In an example, the sizing grammar may describe a model series, such as, for example, the Vblock 300 series from the VCE company. In another example, the grammar interpreter 122 may be configured to interpret a grammar (i.e., sizing grammar) to assist with determining and/or generating one or more potential configurations for a particular model series. In another example, a user may specify a parameter (e.g., a model series), and the grammar interpreter 122 may be configured to determine, identify, and/or select an appropriate grammar for the user-specified model series.

In an implementation, the sizing grammar may include one or more parts including one or more grammar rules and/or one or more configuration motifs (i.e., motif descriptions). For instance, the grammar rules may be configured to describe how to generate the one or more potential configurations in a series, wherein the grammar rules may describe each potential configuration with one or more symbols or a set of symbols, which may be referred to as configuration elements. In another instance, configuration motifs or motif descriptions may be configured to associate the symbols with descriptions of actual physical resources, such as servers, storage controllers, disks, switches, etc., and their capacities and options.

Accordingly, in an implementation, the sizing grammar may describe each of the one or more potential configurations in terms of physical resource characteristics including one or more base configurations that describe one or more physical starting configurations and one or more expanded configurations that describe one or more optional growth configurations for each of the one or more base configurations. In an example, the grammar rules 142 may be stored in memory, such as, for example, in a database (e.g., database 140). In various examples, each grammar rule may include one or more symbols that describe how to generate the one or more potential configurations corresponding to the one or more parameters.

In some examples, in reference to computing, grammar may refer to a syntactic structure or syntax of a language that may be represented as a set of production rules (e.g., grammar rules) for specifying an order of strings in a sentence. Each rule may include one or more symbols, such as, for instance, a left-hand side symbol referring to a syntactic category and a right-hand side symbol referring to a sequence of zero or more symbols. In various examples, each symbol may include either a terminal symbol or a non-terminal symbol, wherein the terminal symbol may correspond to an identifier or operator in a computer language, and the non-terminal symbol may correspond to the left-hand side of a rule. In an implementation, the grammar interpreter 122 may be configured to use the grammar to parse a sentence string and assign a terminal syntactic category to each input symbol and a non-terminal category to each appropriate group of symbols for the sentence. In another implementation, the grammar interpreter 122 may be configured to use the grammar to parse a linear input stream into a data structure that expresses the meaning of the input in a form that is recognizable by a processor.

In the example of FIG. 1, the motif expander 124 may be configured to translate (or convert) the configuration information for each of the one or more potential configurations based on one or more motif descriptions 144 (or configuration motifs) to output resource information for each of the one or more potential configurations corresponding to the one or more parameters. In an example, the motif descriptions 144 may be stored in memory, such as, for example, in a database (e.g., database 140). In various examples, each motif description may associate the one or more symbols of each grammar rule with descriptions of physical resources for computing infrastructure.

The controller 126 may be configured to determine the one or more parameters based on input received from a user via a user interface, such as, for example, the user interface 152. Further, the controller 126 may be configured to select the sizing grammar based on input received from the user via the user interface.

The system 100 may include a modeler 128, a simulator 130, an evaluator 132, and one or more optional database(s) 140. The modeler 128 may be configured to model scenarios for each of the one or more potential configurations received from the configuration generator 120 and provide model information related to the model scenarios to the simulator 130 for simulation. The simulator 130 may be configured to simulate the model scenarios based on the model information related to the model scenarios including the one or more potential configurations corresponding to the one or more parameters. The evaluator 132 may be configured to evaluate response information received from the simulator 130 to select at least one sizing plan for computing infrastructure. In an example, the sizing plan may include an optimal sizing plan. The one or more optional database(s) 140 may be configured to store the one or more grammar piles 142 and the one or more motif descriptions 144.

In various implementations, the system 100 provides efficient capacity planning mechanisms and procedures for automatically generating potential infrastructure configurations. For each generated configuration, the mechanisms and procedures may use various algorithms to simulate utilization. The manner in which these configurations are generated is addressed by the system 100. Further, for each configuration element, the grammar is used for defining motifs, which are detailed descriptions of that element, such as, for example, amount of memory, CPU speed, storage space, etc., which describe the actual resources provided therein. This information is used by the capacity planning system 100 to simulate the resource utilization of the configuration. Thus, a complete configuration may provide a list of all the configuration elements and actual available capacity for that particular configuration.

In the example of FIG. 1, it should be appreciated that the computing infrastructure planning system 100 is shown using various functional blocks or modules that represent more-or-less discrete functionality. However, such illustration is provided for clarity and convenience, and therefore, various functionalities may overlap or may be combined within a described block(s) or module(s), and/or may be implemented by one or more block(s) or module(s) not shown in the example of FIG. 1. Generally, it should be appreciated that conventional functionality that may be considered useful to the system 100 of FIG. 1 may be included as well even though such conventional elements are not shown explicitly, for sake of clarity and convenience.

Figure 2:
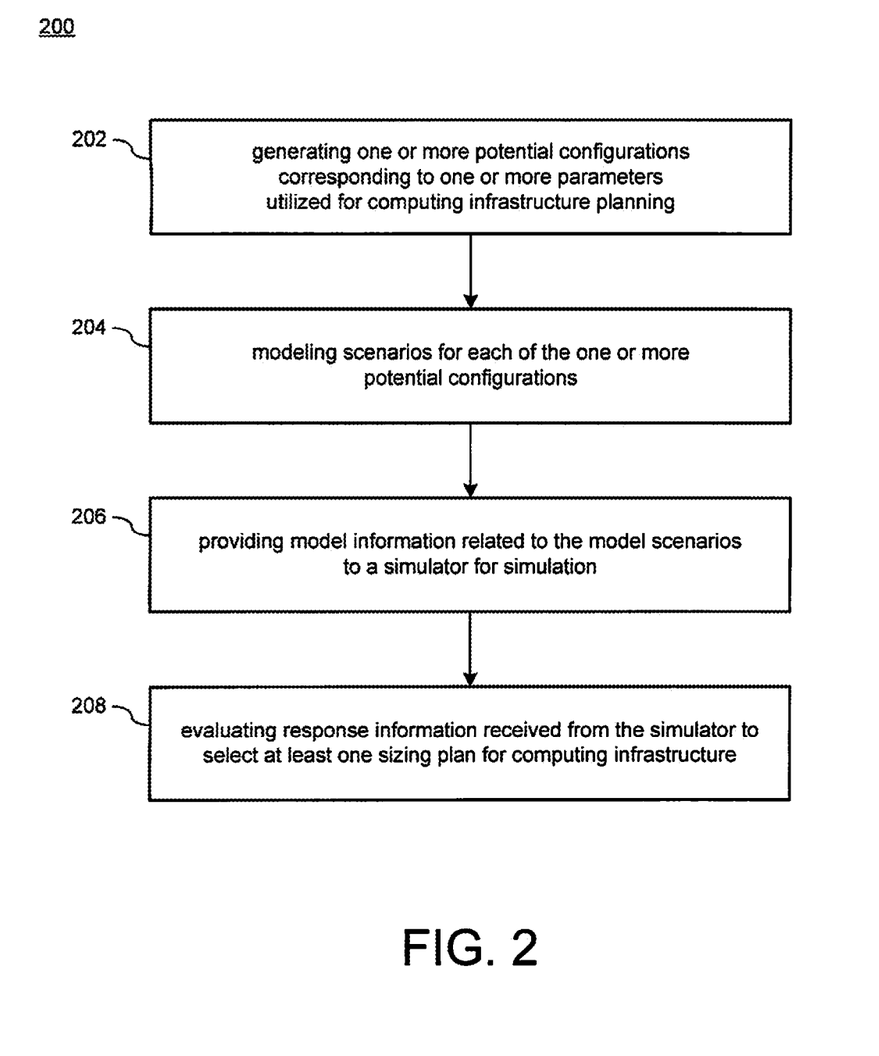
FIG. 2 is a process flow diagram illustrating an example method for computing infrastructure planning, in accordance with aspects of the disclosure.

FIG. 2 is a process flow diagram illustrating an example method 200 for computing infrastructure planning, in accordance with aspects of the disclosure. In the example of FIG. 2, operations 202-208 are illustrated as a series of discrete operations occurring in sequential order. However, in other implementations, two or more of the operations 202-208 may occur in a partially or completely overlapping or parallel manner, or in a nested or looped manner, or may occur in a different order than that shown. Further, additional operations, that may not be specifically shown in the example of FIG. 2, may be included in some other implementations, while, in still other implementations, one or more of the operations 202-208 may be omitted.

In various other implementations, the method 200 may include a process flow for a computer-implemented method for computing infrastructure planning in the system 100 of FIG. 1. Further, as described herein, the operations 202-208 may provide a simplified operational process flow that may be enacted by the computer device 104 to provide features and functionalities as described in reference to FIG. 1.

In the example of FIG. 2, at 202, the method 200 may include generating one or more potential configurations corresponding to one or more parameters utilized for computing infrastructure planning. In an example, the sizing grammar may describe each potential configuration in terms of physical resource characteristics including base configurations that describe physical starting configurations and expanded configurations that describe optional growth configurations for each base configuration. In another example, the base configuration may describe a lower bounded configuration including an initial configuration for generating expanded configurations. In another example, each potential configuration may describe physical resource characteristics including capacity options for a starting quantity of computing devices, storage devices, and/or network devices. In another example, each potential configuration may describe physical resource characteristics including capacity growth options for adding a number of computing devices, storage devices, and/or network devices. In still another example, the one or more parameters may include computing capacity, storage capacity, workload capacity, and/or constraints associated with each capacity including purchase constraint, power constraint, and cooling constraint.

At 204, the method 200 may include modeling scenarios for each of the one or more potential configurations. In various examples, each of the one or more potential configurations corresponding to the one or more parameters may be provided as input for modeling scenarios and for generating model information related to the model scenarios. In an implementation, the method 200 may be configured to represent various modeled scenarios of converged infrastructure platform architecture so that the one or more potential configurations may be automatically generated and evaluated for cost and workload capacity. The sizing grammar is used to represent particular architecture of a model series for converged infrastructure platforms, such as, for example, the Vblock 300 series from the VCE company. In an example, the sizing grammar enables an automatic procedure to start from a base configuration and generate the one or more potential configurations from the base configuration.

At 206, the method 200 may include providing model information related to the model scenarios to a simulator for simulation. In various examples, an efficient procedure is provided to enable capacity planning by automatically generating the potential infrastructure configurations. For each such generated configuration, various algorithms may be used to simulate the utilization. For each configuration element, the grammar defines motifs, which are detailed descriptions of that element, e.g., amount of memory, CPU speed, storage space, etc., which describe included resources. This model information is used to simulate the resource utilization of the configuration. As a result, in an example, a complete configuration includes a list of the configuration elements and actual available capacity for the configuration.

At 208, the method 200 may include evaluating response information received from the simulator to select at least one sizing plan for computing infrastructure, which may include selection of an optimal sizing plan. In an implementation, a model series of any converged infrastructure platform architecture may be represented so that all possible/potential configurations may be generated and evaluated for cost and workload capacity. The representation may refer to the sizing grammar that is used to capture the particular architecture of a model series for any converged infrastructure platform. The sizing grammar enables an automatic procedure to start from a base configuration and from it generate all possible/potential configurations. The system 100 makes use of capacity and performance engineering to evaluate whether a particular configuration may satisfy capacity requirements of certain workloads and whether a series of constrained configurations may be generated for evaluation in a purchasing plan.

Figure 3:
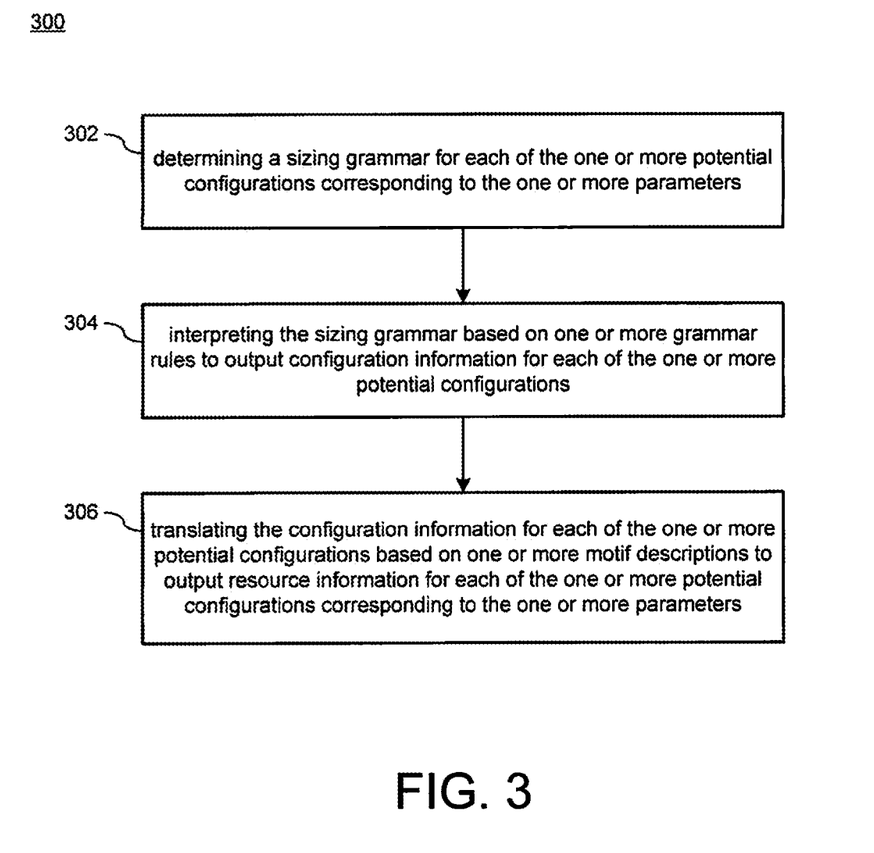
FIG. 3 is a process flow diagram illustrating another example method for computing infrastructure planning, in accordance with aspects of the disclosure.

FIG. 3 is a process flow diagram illustrating an example method 300 for computing infrastructure planning, in accordance with aspects of the disclosure. In the example of FIG. 3, operations 302-306 are illustrated as a series of discrete operations occurring in sequential order. However, in other implementations, two or more of the operations 302-306 may occur in a partially or completely overlapping or parallel manner, or in a nested or looped manner, or may occur in a different order than that shown. Further, additional operations, that may not be specifically shown in the example of FIG. 3, may be included in some other implementations, while, in still other implementations, one or more of the operations 302-306 may be omitted.

In various other implementations, the method 300 may include a process flow for a computer-implemented method for computing infrastructure planning in the system 100 of FIG. 1. Further, as described herein, the operations 302-306 may provide a simplified operational process flow that may be enacted by the computer device 104 to provide features and functionalities as described in reference to FIG. 1.

In the example of FIG. 3, the method 300 describes an implementation of generating one or more potential configurations corresponding to one or more parameters utilized for computing infrastructure planning, as described in reference to block 202 of the method 200 of FIG. 2.

At 302, the method 300 may include determining a sizing grammar for each of the one or more potential configurations corresponding to the one or more parameters. In various examples, a model series of any converged infrastructure platform architecture may be used to represent one or more or all possible/potential configurations, which may be evaluated for cost and workload capacity. The sizing grammar refers to one or more representations configured to identify and capture a particular architecture of the model series for any converged infrastructure platform. The sizing grammar further enables an automatic procedure to start from a base configuration and then generate the one or more or all possible and/or potential configurations therefrom.

In an implementation, the sizing grammar includes two parts: grammar rules and configuration motifs. The grammar rules describe how to generate all the configurations in a series. These describe each configuration with a small set of symbols referred to as configuration elements. The configuration motifs (or motif descriptions) associate the symbols with descriptions of actual physical resources, such as compute servers, storage controllers, disks, switches, etc., and their capacities and options.

At 304, the method 300 may include interpreting the sizing grammar based on one or more grammar rules to output configuration information for each of the one or more potential configurations. The grammar rules may be considered similar to productions in a formal string grammar. The grammar defines a set of terminal symbols and a set of non-terminal symbols. Each grammar rule may show how to replace some non-terminals by terminals. Each application of a grammar rule may produce a new string having some terminals and possibly some non-terminals. By repeatedly applying a sequence of grammar rules, the grammar may be used to generate one or more or all possible sentences. Valid sentences may be those having only non-terminals. Referring to the grammar, each valid sentence may correspond to a single valid configuration of the model series and may define one or more or all compute, network, and storage elements, chosen options, and racks needed to define a complete configuration.

At 306, the method 300 may include translating the configuration information for each of the one or more potential configurations based on one or more motif descriptions to output resource information for each of the one or more potential configurations corresponding to the one or more parameters. For each configuration element, the grammar defines motifs, which may include detailed descriptions of each configuration element, e.g., amount of memory, CPU speed, storage space, etc., which may describe actual physical resources included therein. This information is needed for capacity planning to simulate resource utilization of the configurations. Thus, a complete configuration may include a list of one or more or all configuration elements and also the actual available capacity for each configuration.

Figure 4:
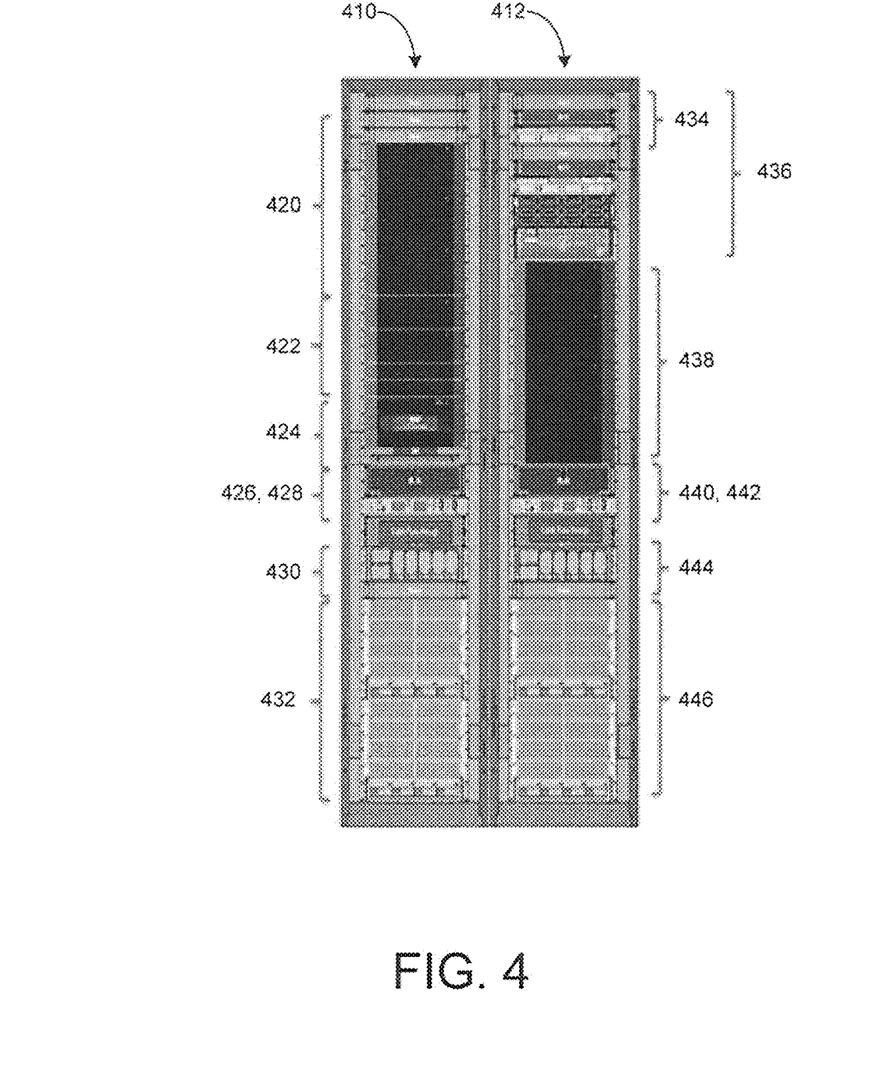
FIG. 4 is a block diagram illustrating an example base configuration of a computing infrastructure, in accordance with aspects of the disclosure.

FIG. 4 is a block diagram illustrating an example base configuration 400 of a computing infrastructure, in accordance with aspects of the disclosure. In various implementations, the system and methods described herein are applicable to converged infrastructure platforms, where computing, storage, and network infrastructure may be packaged in predefined units. An example converged infrastructure platform having a model series includes the converged infrastructure platform of Vblock, which has a set of example model series: 300EX, 300FX, 300GX, 300HX.

For each model series, a base configuration may be defined, and each base configuration may be expanded in predefined ways including, for example, blade server packs may be added in groups of 2, disk array enclosure (DAE) packs may be added in groups of 2, 4, or 8 based on the series, redundant array of independent disks (RAID) packs may be added. In various examples, there may be constraints on maximum and types of each pack for each series.

In various implementations, selecting a particular base configuration may automatically constrain future growth to occur only in certain prescribed increments, up to a certain maximum for each model. For example, storage may be expanded in one or more RAID packs with certain selected types of disk drives, while computing capacity may be expanded in one or more blade packs. Several kinds of options may be available for each configuration, for example, block storage or unified storage. Chosen options may limit types of possible configurations in different ways. Power and physical rack limits may impose additional sub-limits within the growth curve. For example, once a maximum height is reached for a rack, then further expansion may be possible only by adding a new rack, with corresponding increases in power and cooling costs, and a new set of constraints may be applied on what types of computing, networking, and storage elements are supported in a new rack. For each model, there may be a maximum number of racks with a maximum capacity. For example, within this maximum for each model and each possible increment, there may be a corresponding price, and a corresponding workload capacity that may be supported.

In the example of FIG. 4, the base configuration 400 shows an example of a standard (e.g., minimum) sizing capacity for a 300FX series for the Vblock converged infrastructure platform. In an implementation, the base configuration 400 of FIG. 4 may be described by a single sizing grammar.

As shown in the example of FIG. 4, the base configuration 400 may include one or more racks including a first rack 410 and a second rack 412. The first rack 410 may include one or more slots for 4 disk array enclosure DAEs 420, 2 control stations (CS) and/or 2-3 data movers (DM) 422, a disk array processor enclosure (DPE) 424, an Internet protocol (IP) switch 426, a storage area network (SAN) switch 428, a fabric interconnect for computing 430, and 2 blade servers 432. The second rack 412 may include one or more slots for a mini AMP 434, an optional HA AMP 436, 4 disk array enclosure DAEs 438, an IP switch 440, a SAN switch 442, a fabric interconnect for computing 444, and 2 blade servers 446. Together, the first and second racks 410, 412 may be referred to as a compute/storage/network base racks.

Figure 5:
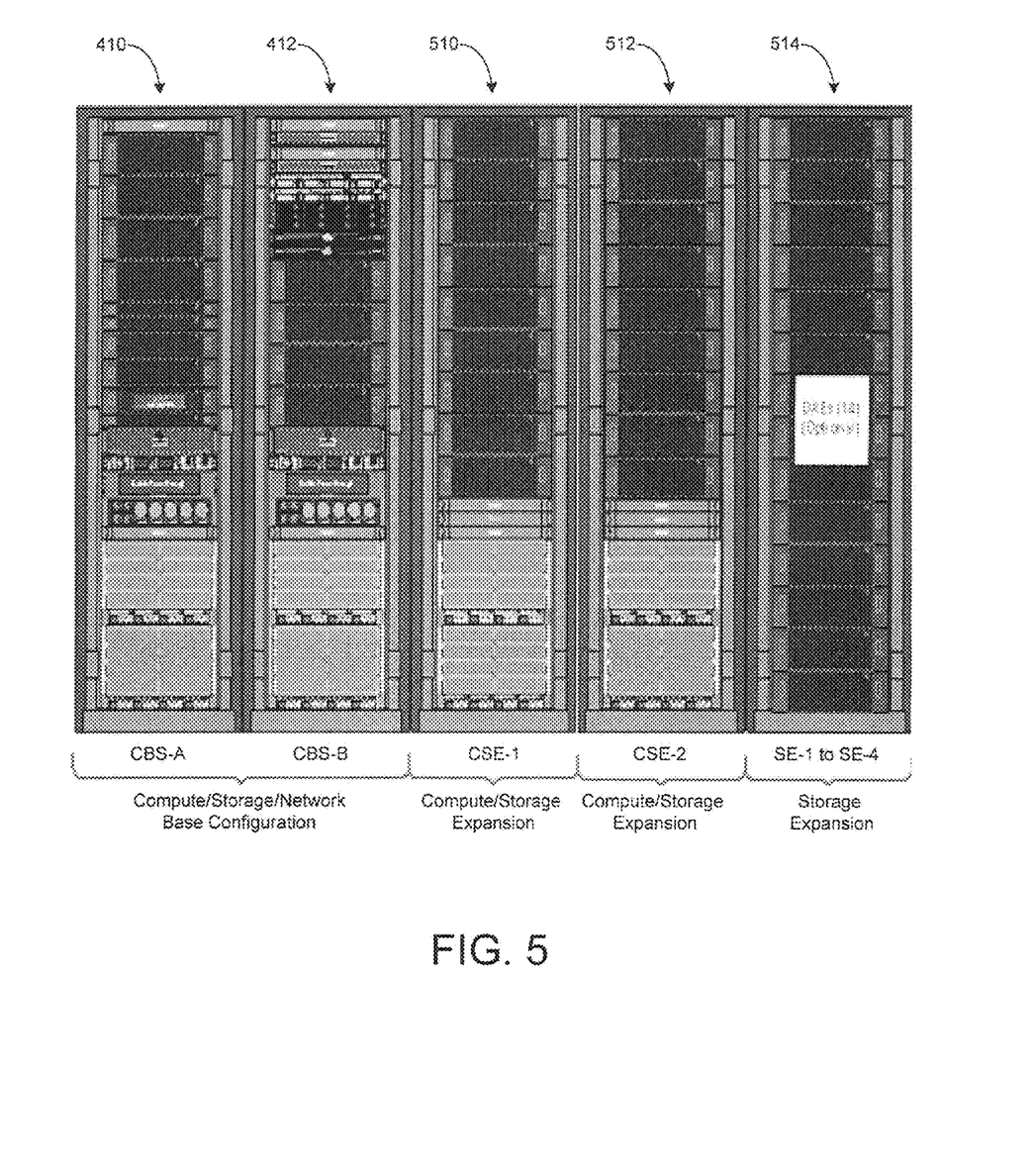
FIG. 5 is a block diagram illustrating an example expanded configuration of a computing infrastructure, in accordance with aspects of the disclosure.

FIG. 5 is a block diagram illustrating an example expanded configuration 500 of a computing infrastructure, in accordance with aspects of the disclosure. In an implementation, the expanded configuration 500 refers to an example of a fully expanded configuration for the series of FIG. 4, and the expanded configuration 500 of FIG. 5 may be described by a single sizing grammar.

As shown in the example of FIG. 5, the expanded configuration 500 may include one or more racks including the first rack 410, the second rack 412, a third rack 510, a fourth rack 512, and a fifth rack 514. The first and second racks 410, 412 may be referred to as compute/storage/network base racks CSB-A, CSB-B, respectively, and include the components as described in reference to FIG. 4.

The third and fourth racks 510, 512 may be referred to as compute/storage expansion racks CSE-1, CSE-2, respectively. In various implementations, each of the third and fourth racks 510, 512 may be considered optional and include one or more slots for additional DAEs and blade servers. For example, each of the third and fourth racks 510, 512 may include one or more slots for 9 DAEs and 2 blade servers.

The fifth rack 514 may be referred to as a storage expansion rack SE, and the fifth rack 514 may include 4 separate racks SE-1, SE-2, SE-3, and SE-4. In various implementations, the fifth rack 514 may be considered optional and include one or more slots for additional DAEs. For example, the fifth rack 514 may include one or more slots for 14 DAEs. In other examples, each of the 4 separate racks SE-1, SE-2, SE-3, and SE-4 may include one or more slots for 14 DAEs for a total of 56 DAEs.

As such, in various examples, the expanded configuration 500 of FIG. 5 may include one to eight racks including the first rack 410 (CSB-A), the second rack 412 (CSB-B), the third rack 510 (CSE-1), the fourth rack 512 (CSE-2), the fifth rack 514 (SE-1), and three additional storage expansion racks (SE-2, SE-3, SE-4).

Figure 6:
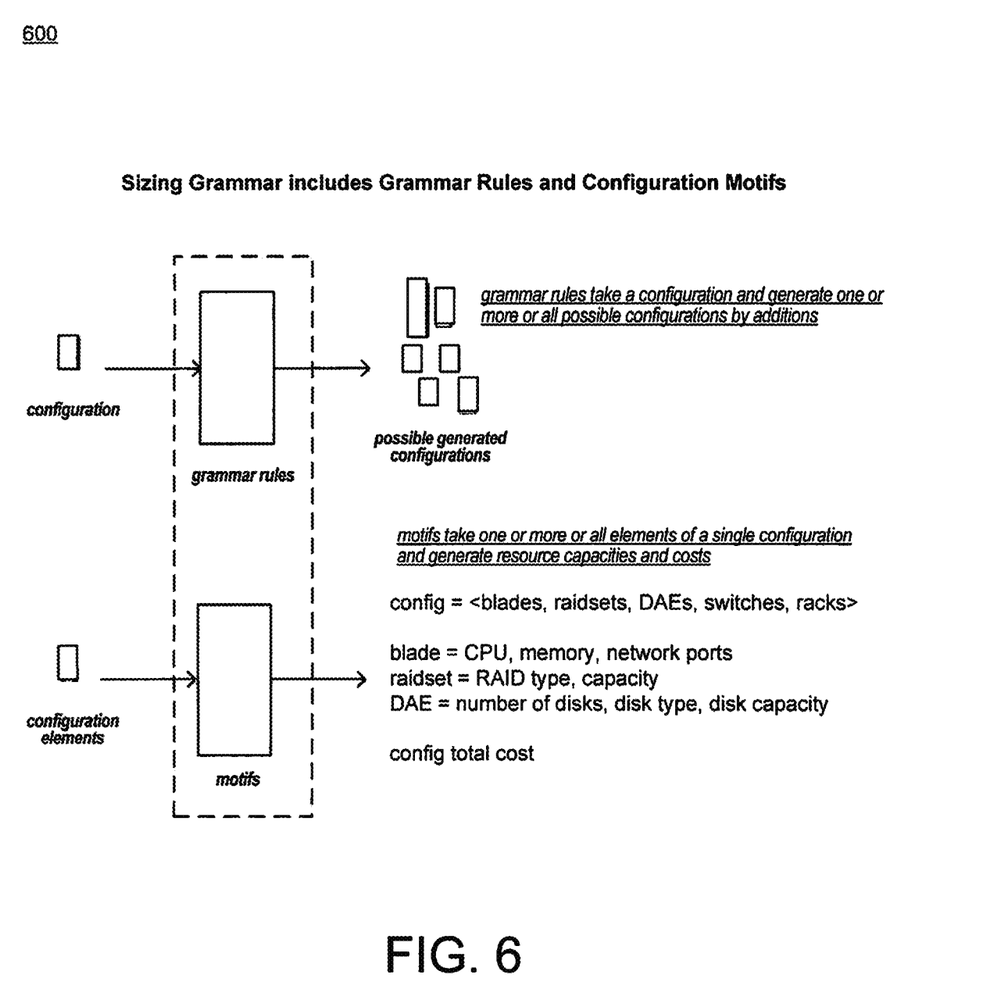
FIG. 6 is a block diagram illustrating an example description of a sizing grammar, in accordance with aspects of the disclosure.

FIG. 6 is a block diagram illustrating an example description of a sizing grammar, in accordance with aspects of the disclosure. In an implementation, the sizing grammar may include grammar rules and configuration motifs (i.e., motif descriptions). In an example, grammar rules may take a configuration and generate all possible and/or potential configurations by additions. For instance, the grammar rules may describe how to generate all the configurations in a series, and the grammar rules may further describe each configuration with a small set of symbols, referred to as configuration elements. In another example, configuration motifs (i.e., motif descriptions) may take all elements of a single configuration and generate the resource capacities and costs. For instance, configuration motifs may associate symbols with descriptions of actual resources, such as, for example, computing servers, storage controllers, disks, switches, etc., and their capacities and options.

As shown in FIG. 6, an example configuration motif may include:

config=<blades, raidsets, DAEs, switches, racks>
blade=CPU, memory, network ports
raidset=RAID type, capacity
DAE=number of disks, disk type, disk capacity
config total cost In accordance with aspects of the disclosure, the grammar rules may be similar to productions in a formal string grammar. The grammar defines a set of terminal symbols and a set of non-terminal symbols. Each rule shows how to replace some non-terminals by terminals. Each application of a rule produces a new string containing some terminals and possibly some non-terminals. Thus, by repeatedly applying a sequence of rules, the grammar may be used to generate all possible sentences. In an example, valid sentences may be those sentences containing only non-terminals.

Further, in reference to the grammar described herein, each valid sentence may correspond to a single valid configuration of the model series, which defines all the computing, network, and storage elements, all chosen options, and all racks needed to define a complete configuration.

In various implementations, the grammar may be defined with one or more of the following. Each option choice (e.g., block storage or unified storage) may be represented by a non-terminal symbol, and its possible options may be terminal symbols (e.g., block, unified). Each repeating element (e.g., disk array enclosures) may be represented by a set of non-terminal symbols, and each actual occurrence may be represented by a terminal symbol. Thus, rules may generate configurations with repeating elements up to a maximum allowable number. Each available slot in a rack may be represented by a non-terminal symbol. Each filling of a slot may be represented by a rule in the grammar that replaces the slot by a configuration element. Thus, rules may generate configurations containing a required number of racks. Further, each actual configuration element (e.g., a blade server, or a disk array enclosure) may be represented by a terminal symbol. These terminal symbols may be instantiated by being mentioned on the right-hand sides of rules. Thus, rules may generate configurations containing the actual configuration elements.

Some example rules are given below for the 300EX series Vblock grammar:

300EXblades::=bladepack200 {2}
bladepack200::=B200-m2-2.66-96|B200-m2-3.33-96|
B200-m2-2.93-48|B250-m1-3.33-384|B250-m1-2.93-192
300EXraids::=null
300EXraid::=RAIDPACK{2} raidpack {6}
RAIDPACK::=RAID-1+0|RAID-5|RAID-6
raidpack::=null|RAIDPACK
EXdaes::=DPE dae {3}
dae::=null|DAE
FXdaes::=DPE DAE dae {3}

Configuration Motifs:

For each configuration element, the grammar may also define one or more motifs, which include detailed descriptions of that element, e.g., amount of memory, CPU speed, storage space, etc., which may describe the actual resources contained in it. This information may be needed by the capacity planning mechanism to simulate the resource utilization of the configuration. Thus, a complete configuration is not only a list of all the configuration elements, but also the actual available capacity for that configuration.

In an implementation, the sizing grammar for a particular model series may be defined in reference to vendor documentation. A general program, a generator for the grammar, may then be used generate all possible valid configurations for that model series. Each valid configuration generated may include a complete description of all the configuration elements and their capacities.

Figure 7:
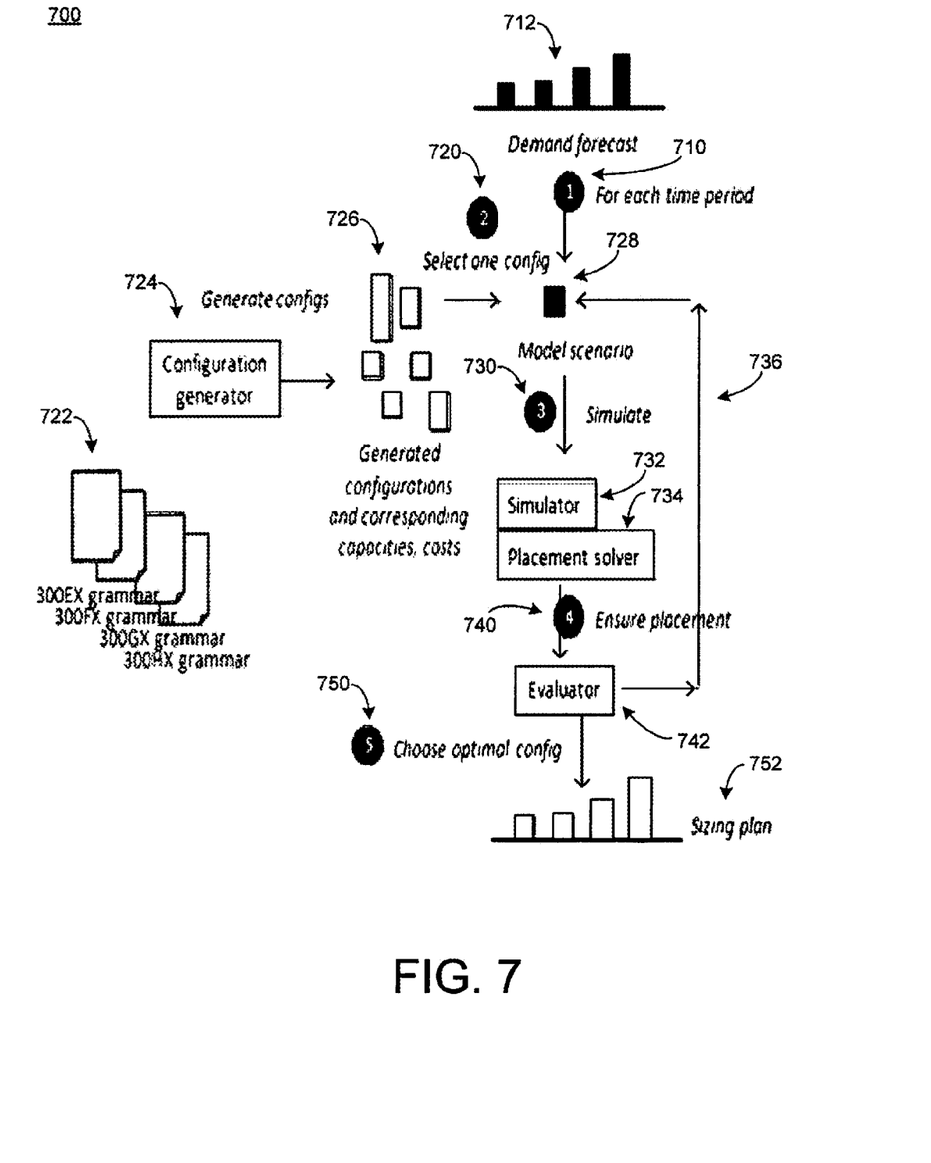
FIG. 7 is a process flow diagram illustrating an example method for finding an appropriate purchasing plan, in accordance with aspects of the disclosure.

FIG. 7 is a process flow diagram illustrating an example method for finding an appropriate purchasing plan, in accordance with aspects of the disclosure.

In an implementation, the configuration generator 120 may be configured to use grammar to generate all possible next configurations, and the evaluator 132 may be configured to choose or select a size needed to satisfy a demand including a forecasted demand. The generator may be used in two ways.

First, in a user-directed mode, a user may interactively generate one or multiple potential configurations by selecting options and choosing whether or not to apply particular grammar rules. In this manner, for example, a user may select a small number of potential configurations that may be used to simulate the utilization for a given workload demand. This may be considered an easier-to-use interactive mechanism for running what-if scenarios Second, in an automated mode, a program may generate larger and larger configurations, each time running the capacity planning simulation, to find an optimal configuration that satisfies user-specified constraints. This is an automated way to find a particular configuration, or to generate a sequence of configurations for a corresponding sequence of anticipated demand over time in the form of a purchasing plan.

The example of FIG. 7 shows how a sizing grammar may be used together with the capacity planning mechanism to automatically generate a purchasing plan for anticipated business demand. In an implementation, referring to 710, business demand is forecasted 712 for each time period in an interval. Using multiple grammars for different model series 722, a configuration generator 724 generates potential configurations and corresponding capacities and costs 726, and referring to 720, at least one configuration is selected from the pool of potential configurations and corresponding capacities and costs 726. The configuration generator 724 may use one or more of the grammars 722 to generate one or all possible or potential configurations. The business demand forecast 712 for each time period and the at least one selected potential configuration 726 are provided as input for generating a model scenario 728, and referring to 730, model information related to the model scenario 728 is provided to a simulator 732 for simulation. The simulator 732 may work with a placement solver 734 to ensure workload placement. Referring to 740, an evaluator 742 may be used to evaluate response information received from the simulator 732 and/or the placement solver 734 to generate and select at least one sizing plan 752 for computing infrastructure, which may include an optimal sizing plan. Depending on the evaluation results, the evaluator 742 may recursively process 736 each next potential configuration with model scenarios 728 and simulation 732 to generate multiple sizing plans for evaluation. Referring to 750, the evaluator 742 may be used to select a sizing plan needed to satisfy the forecasted business demand 712.

In an aspect of the disclosure, sizing grammars may be used to describe configurations of engineering components for computing infrastructure, architecture, and design. The sizing grammars may be used to describe possible next configurations in capacity planning for information technology (IT) infrastructure management. Further, vendor architecture documentation may be used as a source for representing knowledge in the form of a sizing grammar. Further, aspects of the disclosure address how a series of constrained configurations may be generated for evaluation in a purchasing plan.

The systems and methods described herein may be configured to represent an entire possible set of constrained configurations, which may be applied to a wide variety of architecture. The systems and methods described herein may be configured to automate systematic and exhaustive generation of all possible configurations, and only the possible configurations, which may provide and improve scalability. The systems and methods described herein may be configured to provide a short, explicit representation of computing infrastructure, so as to be modified when the architecture is modified by the vendor, to generate a new set of configurations. This also makes it scalable with respect to changing vendor architectures.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system for computing infrastructure planning, the system comprising:
   at least one memory including instructions; and
   at least one processor that is operably coupled to the at least one memory and that is arranged and configured to execute the instructions that, when executed, cause the at least one processor to implement:
   a configuration generator configured to generate multiple potential configurations that each satisfy at least one parameter utilized for computing infrastructure planning, wherein the configuration generator includes:
   a grammar interpreter configured to read and interpret a sizing grammar based on at least one grammar rule and to generate and output configuration information for all potential configurations, wherein the sizing grammar describes each of the potential configurations in terms of physical resource characteristics including one or more base configurations that describe one or more physical starting configurations and one or more expanded configurations that describe one or more optional growth configurations for each of the one or more base configurations; and
   a motif expander configured to translate the configuration information for each of the potential configurations based on one or more motif descriptions to generate and output resource information for each of the potential configurations that each satisfy the at least one parameter.

2. The system of claim 1, wherein the computing infrastructure planning includes capacity planning for computing infrastructure including one or more of computing capacity planning, storage capacity planning, and network capacity planning while maintaining a threshold for cost of the one or more potential configurations.

3. The system of claim 1, the configuration generator further comprising a controller configured to:
determine the at least one parameter based on input received from a user via a user interface; and
select the sizing grammar based on input received from the user via the user interface.

4. The system of claim 1, wherein the at least one processor is arranged and configured to execute the instructions that, when executed, cause the at least one processor to implement:
a modeler configured to model scenarios for the potential configurations received from the configuration generator and provide model information related to the model scenarios to a simulator for simulation; and
an evaluator configured to evaluate response information received from the simulator to select at least one sizing plan for computing infrastructure.

5. The system of claim 1, wherein each of the potential configurations include one or more base configurations describing one or more lower bounded configurations including one or more initial configurations for generating one or more expanded configurations based on each of the one or more base configurations.

6. The system of claim 1, wherein each of the potential configurations include one or more expanded configurations describing one or more incremental bounded configurations including one or more upper bounded configurations.

7. The system of claim 1, wherein each of the potential configurations include a base configuration describing one or more physical resource characteristics including capacity options for a starting quantity of computing devices, storage devices, and network devices.

8. The system of claim 1, wherein each of the potential configurations include a base configuration describing one or more physical resource characteristics including capacity growth options for adding a number of computing devices, storage devices, and network devices.

9. The system of claim 1, wherein the at least one parameter includes at least one of computing capacity, storage capacity, workload capacity, and one or more constraints associated with each capacity including purchase constraint, power constraint, and cooling constraint.

10. The system of claim 1, wherein:
each grammar rule includes one or more symbols that describe how to generate the potential configurations satisfying the at least one parameter, and
each motif description associates the one or more symbols of each grammar rule with descriptions of physical resources for the computing infrastructure.

11. A computer-implemented method, comprising:
generating multiple potential configurations that each satisfy at least one parameter utilized for computing infrastructure planning including:
reading and interpreting a sizing grammar based on at least one grammar rule and generating and outputting configuration information for all potential configurations, wherein the sizing grammar describes each of the potential configurations in terms of physical resource characteristics including one or more base configurations that describe one or more physical starting configurations and one or more expanded configurations that describe one or more optional growth configurations for each of the one or more base configurations, and
translating the configuration information for each of the potential configurations based on one or more motif descriptions to generate and output resource information for each of the potential configurations that each satisfy the at least one parameter.

12. The method of claim 11, further comprising:
modeling scenarios for the potential configurations received from the configuration generator;
providing model information related to the model scenarios to a simulator for simulation; and
evaluating response information received from the simulator to select at least one sizing plan for computing infrastructure.

13. The method of claim 11, wherein the at least one parameter includes at least one of computing capacity, storage capacity, workload capacity, and one or more constraints associated with each capacity including purchase constraint, power constraint, and cooling constraint.

14. The method of claim 11, wherein:
each grammar rule includes one or more symbols that describe how to generate each of the potential configurations satisfying the at least one parameter, and
each motif description associates the one or more symbols of each grammar rule with descriptions of physical resources for the computing infrastructure.

15. A non-transitory computer readable medium storing instructions that, when executed by at least one processor, are configured to:
generate multiple potential configurations that each satisfy at least one parameter utilized for computing infrastructure planning including:
reading and interpreting a sizing grammar based on at least one grammar rule and generating and outputting configuration information for all potential configurations, wherein the sizing grammar describes each of the potential configurations in terms of physical resource characteristics including one or more base configurations that describe one or more physical starting configurations and one or more expanded configurations that describe one or more optional growth configurations for each of the one or more base configurations, and
translating the configuration information for each of the potential configurations based on one or more motif descriptions to generate and output resource information for each of the potential configurations that each satisfy the at least one parameter.

16. The non-transitory computer readable medium of claim 15, further comprising instructions that, when executed by at least one processor, are configured to:
model scenarios for the potential configurations received from the configuration generator;
provide model information related to the model scenarios to a simulator for simulation; and
evaluate response information received from the simulator to select at least one sizing plan for computing infrastructure.

17. The non-transitory computer readable medium of claim 15, wherein:
the at least one parameter includes at least one of computing capacity, storage capacity, workload capacity, and one or more constraints associated with each capacity including purchase constraint, power constraint, and cooling constraint, each grammar rule includes one or more symbols that describe how to generate each of the potential configurations that satisfy the at least one parameter, and each motif description associates the one or more symbols of each grammar rule with descriptions of physical resources for the computing infrastructure.

* * * * *